United States Patent [19]

Pease et al.

[11] 4,078,281

[45] Mar. 14, 1978

[54] HOSE CLAMP WITH TANGENTIAL SCREW

[76] Inventors: James F. Pease, 5805 Folkestone Dr., Dayton, Ohio 45459; Alan F. Meckstroth, 2357 Shelterwood Dr., Dayton, Ohio 45409

[21] Appl. No.: 703,760

[22] Filed: Jul. 9, 1976

Related U.S. Application Data

[63] Continuation-in-part of Ser. No. 565,545, Apr. 7, 1975, abandoned.

[51] Int. Cl.² .............................................. F16L 33/04
[52] U.S. Cl. ..................................................... 24/279
[58] Field of Search ............... 24/279; 339/251; 85/36

[56] References Cited

U.S. PATENT DOCUMENTS

| 312,755 | 2/1885 | Patterson | 339/251 |
|---|---|---|---|
| 1,473,715 | 11/1923 | Wessel | 24/279 |
| 1,830,558 | 11/1931 | Olson | 24/279 |
| 2,090,374 | 8/1937 | Olson | 24/279 |
| 2,359,418 | 10/1944 | Hartman | 24/275 |
| 2,680,892 | 6/1954 | King | 24/279 |
| 2,703,721 | 3/1955 | Montgomery | 24/279 |
| 3,142,881 | 8/1964 | Johnston | 24/279 |
| 3,361,403 | 1/1968 | Oeler | 24/279 |
| 3,944,265 | 3/1976 | Hiemstra | 24/279 |
| 3,952,475 | 4/1976 | Paskert | 85/36 |

FOREIGN PATENT DOCUMENTS

| 119,061 | 10/1946 | Australia | 85/36 |
|---|---|---|---|
| 20,723 | 8/1929 | Netherlands | 24/279 |

*Primary Examiner*—Bernard A. Gelak
*Attorney, Agent, or Firm*—Jacox & Meckstroth

[57] ABSTRACT

A thin sheet metal strip having a thickness less than .015 inch, forms a part-cylindrical portion which integrally connects a folded first ear portion and a folded second ear portion. An integral tongue projects from the folded first ear portion and has a pair of parallel longitudinal ribs which project inwardly and interfit with corresponding circumferential ribs formed within said part-cylindrical portion. A screw projects through holes within the ear portions, and the second ear portion is adapted to converge toward the first ear portion and at a substantial angle relative to the axis of the screw when the screw is tightened for producing a positive non-stripping cocking engagement with the screw. Each of the folded ear portions has a pair of generally triangular side flanges for reinforcing the ear portion, and in one embodiment, the screw engages the tongue to urge it against the hose being clamped.

19 Claims, 6 Drawing Figures

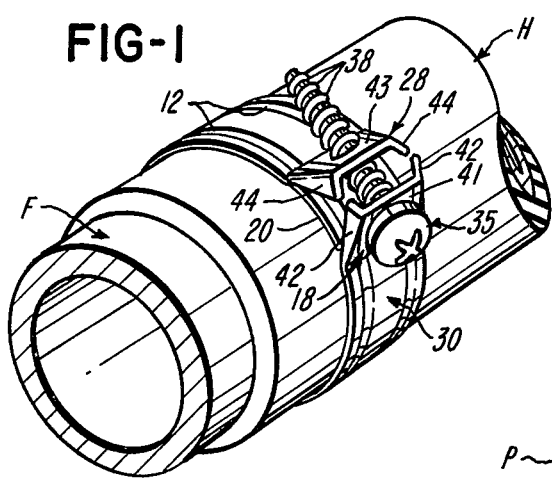
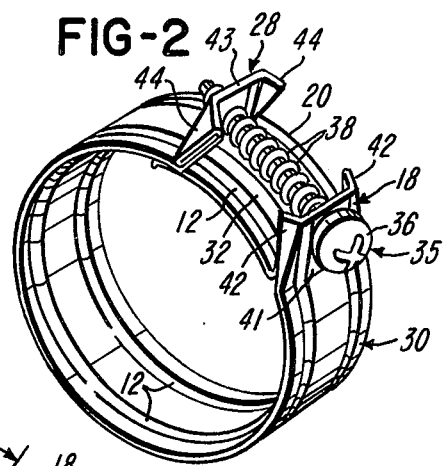
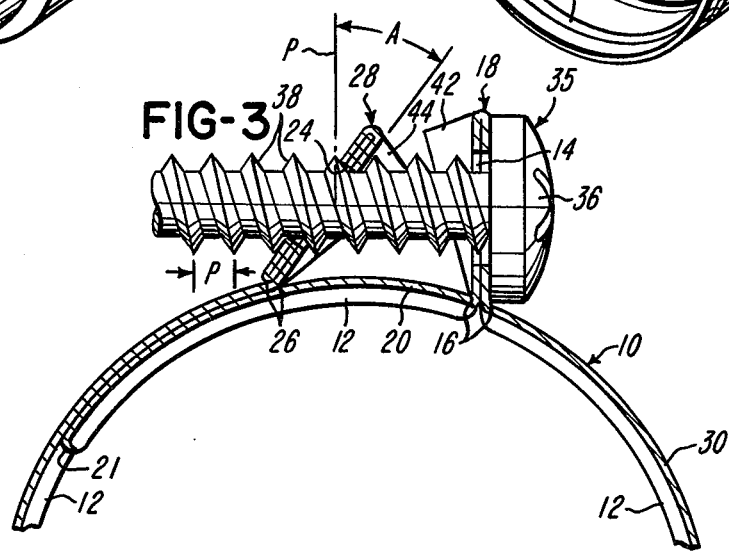
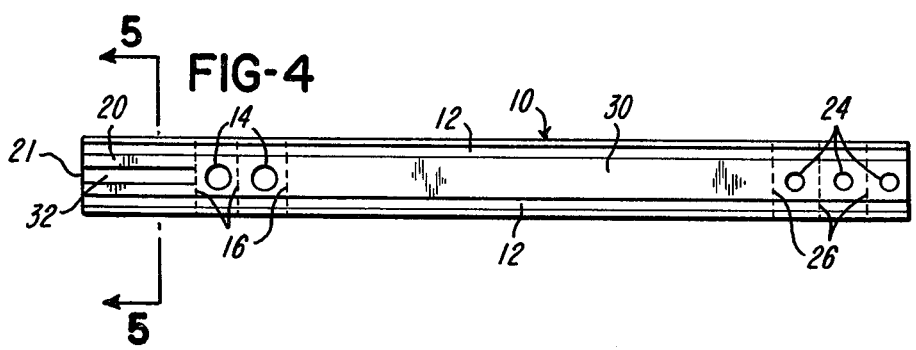
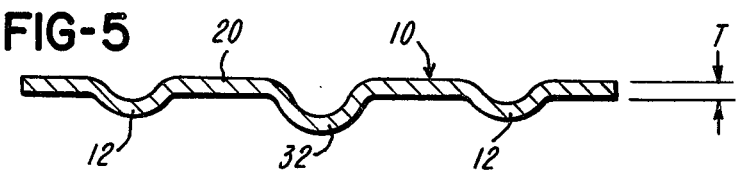

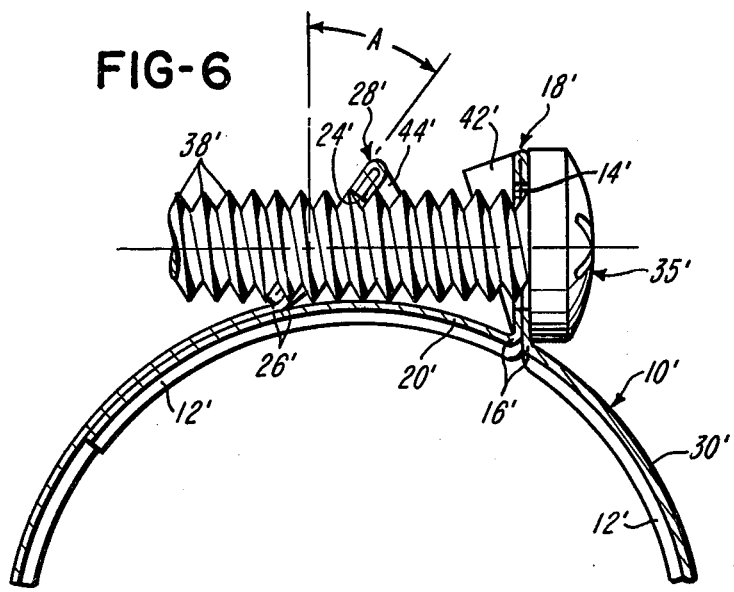

4,078,281

HOSE CLAMP WITH TANGENTIAL SCREW

RELATED APPLICATION

This application is a continuation-in-part of U.S. application Ser. No. 565,545, filed Apr. 7, 1975, now abandoned.

BACKGROUND OF THE INVENTION

In the production of adjustable type hose clamps which are commonly used on resilient tubes or hoses in appliances such as clothes washing and dishwashing machines and in connection with engines for motor vehicles, there have been many different forms of hose clamps either proposed or used for securing a hose to a tubular fitting. One of the most common types of hose clamps incorporates a cylindrical metal band which connects a pair of outwardly projecting integral ears having holes for receiving a tangential screw and nut. The adjustable screw provides for accommodating variations in the diameter of the hose and also permits tightening the band to a predetermined compression in addition to permitting the removal and reuse of the hose clamp. Hose clamps may also be made in adjustable interconnecting sections, for example, as disclosed in U.S. Pat. No. 1,340,937.

In one hose clamp which is commonly used, a narrow tongue is punched from the band and is folded back to bridge the gap between the ears so that a clamping force is applied completely around the hose. The band is constructed of a relatively heavy gauge sheet metal, for example, .040 inch or greater, in order to avoid bending of the integral ears and to provide the narrow tongue with sufficient strength.

In view of the substantial number of hose clamps which are used, for example, in the appliance industry, there have been many efforts to reduce the cost of producing hose clamps so that they can be sold in volume at a low price. For example, the manufacturing cost has been reduced by eliminating the nut which receives the machine screw. Thus in one clamp design, the sheet metal forming the ear which receives the screw threads is extruded slightly to form the hole in the ear, and the extrusion is threaded to receive the screw.

It is also known to form the ear by double folding the end portion of the metal band and providing a threaded hole within the ear, for example, as disclosed in U.S. Pat. No. 1,187,430. The sheet metal which forms the ear may also be stamped and heat treated to form either a double sheet metal nut such as disclosed in U.S. Pat. No. 3,648,335 or a single sheet metal nut such as disclosed in U.S. Pat. No. 2,335,464 and No. 2,359,418. However, in each of these hose clamp designs, the metal which forms the combined ear and nut, must have substantial thickness and/or be of a steel which can be tempered hard to prevent stripping of the screw through the sheet metal nut.

It is apparent from the hose clamps referred to above that the substantial strength which is required in the ears in order to maintain the ears substantially perpendicular to the axis of the tangential screw and to prevent collapsing of the ears and/or stripping of the screws through the ears, has dictated that the clamp be formed from a sheet metal strip having substantial strength and resistance to bending. Thus the sheet metal is selected on a basis of strength required in the ears of the clamp rather than on a basis of the strength required in the ears of the clamp which extends around the hose. As a result, the hose clamps are commonly produced from cold rolled carbon sheet metal having substantial thickness which also tends to prevent the clamp from conforming to an out-of-round condition and thus increases the possibility of a leak developing with a non-cylindrical hose.

It is further desirable for a hose clamp to apply a radial clamping force over a substantial area of the hose in a manner whereby the clamping force is not significantly released by either softening or "cold flowing" of the hose material as a result of the clamping pressure being applied over a substantial period of time. U.S. Pat. No. 3,765,066 discloses one form of hose clamp which was designed to maintain a continuous clamping pressure around the hose.

SUMMARY OF THE INVENTION

The present invention is directed to an improved hose clamp of the tangential screw type and which provides for a significant reduction in the cost of producing the clamp. In addition, the hose clamp of the invention provides for accommodating hoses and fittings which are not truly circular or are out-of-round, and also is effective to apply a substantially uniform radial pressure completely around the resilient hose.

In accordance with one embodiment of the invention, a part-cylindrical band is formed from a relatively thin easily bendable sheet metal strip which has a thickness between 0.010 and 0.015 inch. Thus the thickness of the sheet metal strip is less than one-third of the thickness of the sheet metal strip which is used in producing the conventional types of hose clamps described above. The strip is folded to form a first ear portion and a second ear portion which are integrally connected by the part-cylindrical band.

The band also has a pair of longitudinally extending and inwardly projecting circumferential ribs which interfit with corresponding ribs formed on a tongue portion projecting integrally from the first ear portion. Both folded ear portions are provided with generally triangular side flanges, and the ear portions have holes for receiving a tangential screw. The hole in the second ear portion receives the threads, and the second ear portion projects at a substantial angle relative to the axis of the screw when the screw is tightened to provide a positive non-stripping engagement of the screw with the second ear portion. In another embodiment, the tangential screw presses against the tongue portion to assure a continuous clamping pressure between the ear portions.

Other features and advantages of the invention will be apparent from the following description, the accompanying drawing and the appended claims.

BRIEF DESCRIPTION OF THE DRAWING

FIG. 1 is a fragmentary perspective view of a resilient hose secured to a cylindrical fitting by a hose clamp constructed in accordance with the invention;

FIG. 2 is a perspective view of the hose clamp shown in FIG. 1 and illustrating the clamp in its released or expanded position;

FIG. 3 is an enlarged fragmentary section of the hose clamp shown in FIG. 1 and also illustrating the clamp in its tightened or gripping position;

FIG. 4 is a plan view of a sheet metal strip which is used to form the hose clamp shown in FIGS. 1–3;

FIG. 5 is a greatly enlarged section of the sheet metal strip taken generally on the line 5—5 of FIG. 4; and FIG. 6 is an enlarged fragmentary section similar to FIG. 3 and a showing modified form of a hose clamp constructed in accordance with the invention.

DESCRIPTION OF THE PREFERRED EMBODIMENT

Referring to the drawing, an elongated strip 10 (FIG. 4) of thin cold rolled sheet metal having a thickness T less than 0.020 inch and preferably less than 0.015 inch and on the order of 0.012 inch, is formed with a pair of longitudinally extending parallel ribs 12 which may be either stamped or roll formed within the strip. The strip 10 has a protective coating of a corrosion resisting material such as zinc galvanize coating. One end portion of the strip 10 is punched to form two circular holes 14 and is folded along three parallel spaced lines 16 to form a first ear portion 18 (FIG. 3) having a double wall thickness. The strip also forms an integral tongue portion 20 which projects from the first ear portion 18 and which is provided with a slightly inwardly curved end portion or surface 21 (FIG. 4) and a part-cylindrical curvature (FIG. 3) conforming to a predetermined diameter.

The opposite end portion of the strip 10 is punched with a set of three circular holes 24 and is progressively folded along three parallel lines 26 to form a second ear portion 28 having a triple wall thickness. The ear portions 18 and 28 are integrally connected by an intermediate strip portion 30 which has a part-cylindrical configuration corresponding to the diameter of the tongue portion 20. As shown in FIG. 3-5, the tongue portion 20 is also provided with an intermediate rib 32 which extends from the first ear portion 18 to the end surface 21 and projects inwardly slightly more than the ribs 12.

A standard sheet metal screw 35 extends through the holes 14 and 24 within the corresponding ear portions 18 and 28, and includes a recessed head portion 36 which abuts the first ear portion 18. The threads 38 of the screw 35 have a coarse pitch P relative to the thickness of the sheet metal strip 10. For example, the screw 35 may consist of a No. 8-15, type AC screw which has a thread pitch P of approximately 0.067 inch in comparison with the thickness of the strip 10 of 0.012 inch. The outside diameter a No. 8-15 screw is approximately .168 inch, and the inner diameter is approximately 0.122 inch. When the sheet metal screw 35 is a No. 8-15, the aligned clearance holes 14 within the first ear portion 8 preferably have a diameter of about .188 inch, and aligned holes 24 within the second ear portion 28 preferably have a diameter of about 0.140 inch, or slightly greater than the inner diameter of the screw 35.

As illustrated in FIGS. 1-3, the first ear portion 18 of the hose clamp includes a generally flat trapezoid-shaped base wall 41 connecting a pair of triangular side flanges 42. The side flanges 42 project inwardly at an obtuse angle from the base wall 41 and cooperate to reinforce the ear portion 18. Similarly, the second ear portion 28 includes a generally flat trapezoid-shaped base wall 43 connecting a pair of generally triangular side flanges 44 which project inwardly from the base wall 43 at an obtuse angle and cooperate to reinforce the ear portion 28.

When the hose clamp is in its unclamped or expanded position (FIG. 2), the outer end portion of the tongue 20 projects under the second ear portion 28. In this expanded position, the hose clamp is positioned on the end portion of a resilient or rubber tube or hose H which receives a projecting cylindrical coupling or fitting F. When the sheet metal screw 35 is tightened, the ribs 12 within the part-cylindrical intermediate strip portion 30, interfit with the corresponding ribs 12 within the tongue portion 20 so that the tongue portion is maintained in alignment with the part-cylindrical intermediate strip portion 30.

As the threads of the screw 35 are rotated within the ear portion 28, the ear portion 28 bends along the fold line 26 where it connects with the part-cylindrical intermediate portion 30 and tilts to an inclined position converging towards the first ear portion 18 and forming a substantial acute angle A, for example, between 30° and 50° with a plane P perpendicular to the axis of the screw 35. As the ear portion 28 tilts or cocks on the screw 35 in response to an increasing torque applied to the screw, the engagement of the ear portion 28 with the screw becomes more positive and self-locking so that the screw is prevented from stripping through the hole 24 within the ear portion 28.

FIG. 6 shows a modified hose clamp which is constructed substantially the same as the hose clamp shown in FIGS. 1-3. Accordingly, the common components and structure are identified with the same reference numbers, except with the addition of a prime mark after each reference number in FIG. 6. The primary difference between the hose clamp shown in FIG. 6 and the hose clamp shown in FIGS. 1-3 is that the screw 35' (FIG. 6) is a machine screw instead of a sheet metal screw. For example, the screw 35' illustrated is a No. 10-24 plated steel screw.

Also, in the hose clamp modification shown in FIG. 6, the hole 24' on the second ear portion 28' has the same diameter as the clearance hole 14' in the first ear portion 18'. However, when the screw 35' is tightened, the substantial tilting or cocking of the ear portion 28' causes the ear portion to grip the screw threads in a manner which prevents stripping of screw 35' through the ear portion 28', even when the screw is tightened with a power driven screw driver. In addition, the location of the holes 14' and 24' within their respective ear portions and the spacing between the ear portions are selected so that the bottom of the screw thread 38' firmly engage and press against the tongue portion 20' when the screw 35' is tightened. This pressing action not only prevents any possible buckling in the tongue portion 20' but also assures that the tongue portion exerts a continuous inwardly directed clamping pressure between the ear portions 18' and 28'. Thus in the modification shown in FIG. 6, the stiffening center rib 32 shown in the hose clamp described in connection with FIGS. 1-5, may be eliminated.

From the drawing and the above description, it is apparent that a hose clamp constructed in accordance with the present invention, provides desirable features and advantages. For example, the thinness of the sheet metal strip 10 and the use of the standard screw 35 or 35' without a conventional nut, minimizes the material cost of the hose clamp. In addition, the construction of the two part clamp is adapted for automatic production so that it requires a minimum of labor.

Another important feature is provided by the substantial tilting or cocking of the ear portion 28 or 28' with respect to the screw 35 or 35' to assure a positive, non-stripping and self-locking engagement between the ear portion and the screw. In addition, the three wall thickness of the ear portion 28 or 28' provides for substantial metal engagement between the ear portion and the screw and cooperates to prevent stripping of the screw through the ear portion. Furthermore, the inwardly projecting ribs within the tongue portion and the part-cylindrical intermediate strip portion provide for a concentration of the radial clamping forces along two axially spaced circumferentially extending zones on the resilient hose H. This dual concentration of radial clamping forces completely around the hose, assures a positive seal and minimized "cold flowing" of the resilient or rubber hose material.

As another feature, the thinness of the sheet metal strip 10 provides flexibility which not only permits the ear portion 28 or 28′ to bend, but also permits the hose clamp to conform to substantial out-of-roundness of the exterior surface of the hose H. Furthermore, the pair of inwardly projecting ribs 12 within the tongue portion 20 also cooperate with the center rib 32 to provide the tongue portion 20 with sufficient stiffness to avoid outward bending or buckling of the tongue portion when the hose clamp is tightened. In the modification shown in FIG. 6, the screw 35′ is alsoeffective to press inwardly on the tongue portion 20′ to assure a continuous clamping pressure between the ear portions. In addition, the inwardly projecting end surface 21 prevents the end surface from scraping the inner surface of the strip portion 20 and applying a force which would tend to buckle the tongue portion. As also mentioned above, the inwardly projecting side flanges on the corresponding ear portions cooperate in strengthening the ear portions to avoid bending or collapsing of the base walls of the ear portions when the screw and the hose clamp are tightened.

While the forms of hose clamp herein described constitute preferred embodiments of the invention, it is to be understood that the invention is not limited to these precise forms of clamps, and that changes may be made therein without departing from the scope and spirit of the invention as defined in the appended claims.

The invention having thus been described, the following is claimed:

1. In an adjustable hose clamp including an elongated sheet metal strip having a generally uniform width and thickness, said strip having a part-cylindrical band portion integrally connecting a first ear portion and a second ear portion, said strip further including an integral tongue portion extending between said ear portions, means defining a hole within said first ear portion, a screw extending through said hole and having helical threads, said screw having a head portion for pressing against said first ear portion, and means defining a hole within said second ear portion for receiving said helical threads of said screw, the improvement wherein said second ear portion is formed by a folded end portion of said strip and has an overall thickness substantially less than the overall diameter of said screw, said second ear portion cocks substantially on said screw and directly engages said screw threads in response to tightening said screw, and said second ear portion projects at an angle of at least thirty degrees relative to a plane perpendicular to the axis of said screw and converging relation with said first ear portion for producing a position nonstripping cocking engagement of said second ear portion with said screw threads and to prevent stripping of said screw through said second ear portion.

2. A hose clamp as defined in claim 1 wherein said part-cylindrical band portion includes a plurality of axially spaced and circumferentially extending ribs projecting radially inwardly from the remainder of said strip, and said first and second ear portions include extensions of said ribs.

3. A hose clamp as defined in claim 2 wherein said tongue portion further includes a center rib which extends circumferentially and projects radially inwardly between said plurality of ribs.

4. A hose clamp as defined in claim 1 wherein said second ear portion includes a generally trapezoid-shaped base wall and a pair of generally triangular-shaped side flanges projecting from said base wall.

5. A hose clamp as defined in claim 4 wherein said flanges on said second ear portion porject toward said first ear portion.

6. A hose clamp as defined in claim 1 wherein said first ear portion includes a generally trapezoid-shaped base wall and a pair of generally triangular-shaped side flanges projecting from said base wall.

7. A hose clamp as defined in claim 6 wherein said flanges on said first ear portion project towards said second ear portion.

8. A hose clamp as defined in claim 1 wherein said strip has a thickness less than 0.020 inch.

9. A hose clamp as defined in claim 8 wherein said strip has a thickness less than 0.015 inch.

10. A hose clamp as defined in claim 1 wherein said tongue portion has a radially inwardly projecting end surface spaced from the inner surface of said band portion.

11. A hose clamp as defined in claim 1 wherein said screw threads press radially inwardly on said tongue portion when said screw is tightenend to assure a continuous clamping pressure between said ear portions.

12. In an adjustable hose clamp including an elongated sheet metal strip having a generally uniform width and thickness, said strip having a part-cylindrical band portion integrally connecting a first ear portion and a second ear portion, said strip further including an integral tongue portion extending between said ear portions, means defining a hole within said first ear portion, a screw extending through said hole and having helical threads, said screw having a head portion for pressing against said first ear portion, means defining a hole within said second ear portion for receiving said helical threads of said screw, and said second ear portion has an overall thickness substantially less than the overall diameter of said screw, the improvement wherein said second ear portion cocks substantially on said screw and directly engages said screw threads in response to tightening said screw, said second ear portion includng a generally trapezoid-shaped base wall and a pair of generally triangular-shaped side flanges projecting from said base wall, and said second ear portion projects at a substantial angle relative to a plane perpendicular to the axis of said screw and in converging relation with said first ear portion for producing a positive nonstripping cocking engagement of said second ear portion with said screw threads and to prevent stripping of said screw through said second ear portion.

13. A hose clamp as defined in claim 12 wherein said threads press radially inwardly on said tongue portion when said screw is tightened to assure a continuous clamping pressure between said ear portions.

14. An improved adjustable hose clamp adapted to be produced at a minimum cost, comprising an elongated sheet metal strip having a generally uniform width and a thickness less than 0.020 inch, said strip having a part-cylindrical band portion integrally connecting a closely folded first ear portion and a closely folded second ear portion each having a multiple wall thickness, said strip further including an integral tongue portion extending from said first ear portion toward said second ear portion, means defining a hole within said first ear portion, a screw extending through said hole and having helical threads, said screw having a head portion for pressing against said first ear portion, means defining a hole within said second ear portion for receiving said helical threads of said screw, said second ear portion cocks substantially on said screw and directly engages said screw threads in response to tightening said screw, and said second ear portion projects at an angle of at least thirty degrees relative to a plane perpendicular to the axis of said screw and in converging relation with said first ear portion for producing a positive nonstripping cocking engagement of said second ear portion with said screw threads and to prevent stripping of said screw through said second ear portion.

15. A hose clamp as defined in claim 14 wherein said second ear portion includes a generally trapezoid-shaped base wall and a pair of generally triangular-shaped side flanges projecting from said base wall.

16. A hose clamp as defined in claim 14 wherein said screw threads press radially inwardly on said tongue portion when said screw is tightened to assure a continuous clamping pressure between said ear portions.

17. A hose clamp as defined in claim 14 wherein said holes within said first and second ear portions each has a diameter equal to at least the overall diameter of said screw threads and are capable of receiving said screw without rotating said screw.

18. In an adjustable hose clamp including an elongated sheet metal strip having a generally uniform width and thickness, said strip having a part-cylindrical band portion integrally connecting a first ear portion and a second ear portion, said strip further including an integral tongue portion extending from said first ear portion toward said second ear portion, means defining a hole within said ear portion, a screw extending through said hole and having helical threads, said screw having a head portion for pressing against said first ear portion, and means defining a hole within said second ear portion for receiving said helical threads of said screw, the improvement wherein said second ear portion is formed by a closely folded end portion of said strip, the overall thickness of said folded end portion forming said second ear portion is substantially less than the overall diameter of said screw threads and is less than the pitch of said threads, said second ear portion cocks substantially on said screw and directly engages said screw threads in response to tightening said screw, and said second ear portion projects at an angle of at least thirty degrees relative to a plane perpendicular to the axis of said screw and in converging relation with said first ear portion for producing a positive nonstripping cocking engagement of said second ear portion with said screw threads.

19. A hose clamp as defined in claim 18 wherein said part-cylindrical band portion includes a plurality of axially spaced and circumferentially extending ribs projecting radially inwardly from the remainder of said strip, and said first and second ear portions include extensions of said ribs.

* * * * *

UNITED STATES PATENT AND TRADEMARK OFFICE
CERTIFICATE OF CORRECTION

PATENT NO. : 4,078,281
DATED : March 14, 1978
INVENTOR(S) : James F. Pease and Alan F. Meckstroth It is certified that error appears in the above-identified patent and that said Letters Patent are hereby corrected as shown below:

Column 3, line 46, "8" should be --18--.

Column 5, line 19, "alsoeffective" should be --also effective--.

Column 5, line 58, Claim 1, after "and" insert --in--.

Column 5, line 59 & 60, Claim 1, "position" should be --positive--.

Column 8, line 6, Claim 18, after "said" insert --first--.

Signed and Sealed this

Nineteenth Day of September 1978

[SEAL]

Attest:

RUTH C. MASON
Attesting Officer

DONALD W. BANNER
Commissioner of Patents and Trademarks